INVENTORS
CARL F. PABST
HOLLAND R. HUDSON
BY
*Symmestvedt + Lechner*
ATTORNEYS

June 29, 1965

C. F. PABST ETAL 3,191,470

LATHE

Filed Aug. 21, 1962

INVENTORS
CARL F. PABST
HOLLAND R. HUDSON
BY

*Synnestvedt + Lechner*
ATTORNEYS

June 29, 1965  C. F. PABST ETAL  3,191,470
LATHE

Filed Aug. 21, 1962  8 Sheets-Sheet 5

INVENTORS
CARL F. PABST
HOLLAND R. HUDSON
BY
Synnestvedt & Lechner
ATTORNEYS

June 29, 1965 C. F. PABST ETAL 3,191,470
LATHE
Filed Aug. 21, 1962 8 Sheets-Sheet 6

INVENTORS
CARL F. PABST
HOLLAND R. HUDSON
BY
Synnestvedt + Lechner
ATTORNEYS

June 29, 1965  C. F. PABST ETAL  3,191,470
LATHE
Filed Aug. 21, 1962  8 Sheets-Sheet 7

INVENTORS
CARL F. PABST
HOLLAND R. HUDSON
BY
Synnestvedt + Lechner
ATTORNEYS

June 29, 1965   C. F. PABST ETAL   3,191,470
LATHE
Filed Aug. 21, 1962   8 Sheets-Sheet 8

INVENTORS
CARL F. PABST
HOLLAND R. HUDSON
BY
Symmestvedt + Lechner
ATTORNEYS

United States Patent Office 3,191,470
Patented June 29, 1965

3,191,470
LATHE
Carl F. Pabst, 1336 Thornwood Drive, and Holland R. Hudson, 8844 Long Lane, both of Cincinnati, Ohio
Filed Aug. 21, 1962, Ser. No. 218,322
10 Claims. (Cl. 82—36)

This invention in general relates to cutting type machine tools and in particular relates to improvements in numerically controlled lathes.

More specifically the invention relates to a structure for a numerically controlled lathe having outstanding advantages which provide solutions to various of the important operational problems which necessarily arise in a lathe of the kind in question.

In a numerical controlled lathe, it is important that the machine be capable of turning, facing, etc., not only at the maximum diameter for which the machine was designed, but in addition to be able to cut the minimum diameters both at the head stock and tail stock ends and to do this without large tool overhang at either end, without limiting the size of the head stock chuck and without excessive overhang of the tail stock plunger.

The present invention provides a lathe wherein machining can be accomplished at both the head stock and tail stock ends without the above mentioned limitations. For this purpose, the invention contemplates a disc-like turret head structure holding a plurality of tools, which, in the preferred form, is adapted to rotate in a vertical plane normal to the rotational axis of the workpiece. The structure provides for a relatively flat, vertical side which faces the lathe head stock so that the turret head can be moved across the face of the head stock chuck without interference and machine a workpiece to within a fraction of an inch within the chuck jaws. The vertically rotating arrangement provides for a turret head which is annular and is compacted in an axial direction and, as such, can be moved very closely to the tail stock live center without interference even when the tail stock plunger has a conventional amount of overhang.

In addition to the ability to be physically located for maximum machining capabilities, the present invention has outstanding advantages in enhancing the disposing of chips. In numerically controlled machine tools, particularly lathes, proper chip disposal is very important because with the usual modern day carbide and ceramic tools, practically all of the heat generated from cutting is in the chips and accumulations of hot chips on any part of the machine causes distortion. In numeric control work, machine distortion is most undesirable and utterly intolerable where the distortion is of substantial magnitude and particularly on tool supporting mechanisms.

The structure of the turret head of the invention being disc-like in form and with vertical orientation provides that there is very little chance, if any at all, for chips to accumulate. The turret head presents round or contoured surface which acts as a slide to convey away chips that might fall on the same. Further, the head structure by having vertical rotation tends to throw off any chips which might possibly be deposited during a cutting operation.

One of the most important problems connected with numerically controlled machine tools is that of providing for the cutting tip of any tool selected for operation to occupy a known and fixed position with respect to the rotational axis of the workpiece; i.e., the tip must be on center or lie in a plane containing the rotational axis of the work and occupy a fixed position taken in a direction parallel to the work axis. A tool tip which does not lie in the desired plane will turn a diameter which is greater than the desired diameter depending upon the amount that the tip is spaced from the plane. A tool tip which does not occupy a fixed axial position will erroneously face or turn a shoulder. One or both of these tool position errors is highly undesirable in contouring work since the surface generated will not be true.

The structure of the present invention, particularly in that the tools are rotated in a plane which is normal to the work axis, provides a way of minimizing tool position errors. With vertical orientation, the structure for indexing any tool is arranged so that the tool is located and locked in position without the necessity of imposing locking forces. The absence of such forces eliminates the chance of distortion and insures that each tool will be accurately and positively indexed. The vertical orientation also provides that a tool, when it is indexed into the required plane, can be moved axially against a fixed locating surface which will insure that the tool is accurately and positively positioned at the desired axial point. For axially locating and holding the turret, the invention contemplates a unique clamping arrangement which imposes sufficient clamping forces without causing distortion of the curret head.

While we have commented with respect to the invention in terms of a horizontally oriented, numerically controlled lathe, it will be understood as the description proceeds that the invention in many aspects, is applicable to a lathe not horizontally oriented and also applicable to other types of machine tools.

Various other advantages and features of the invention will be apparent from the description below, taken in connection with the following drawings wherein.

Figure 1:
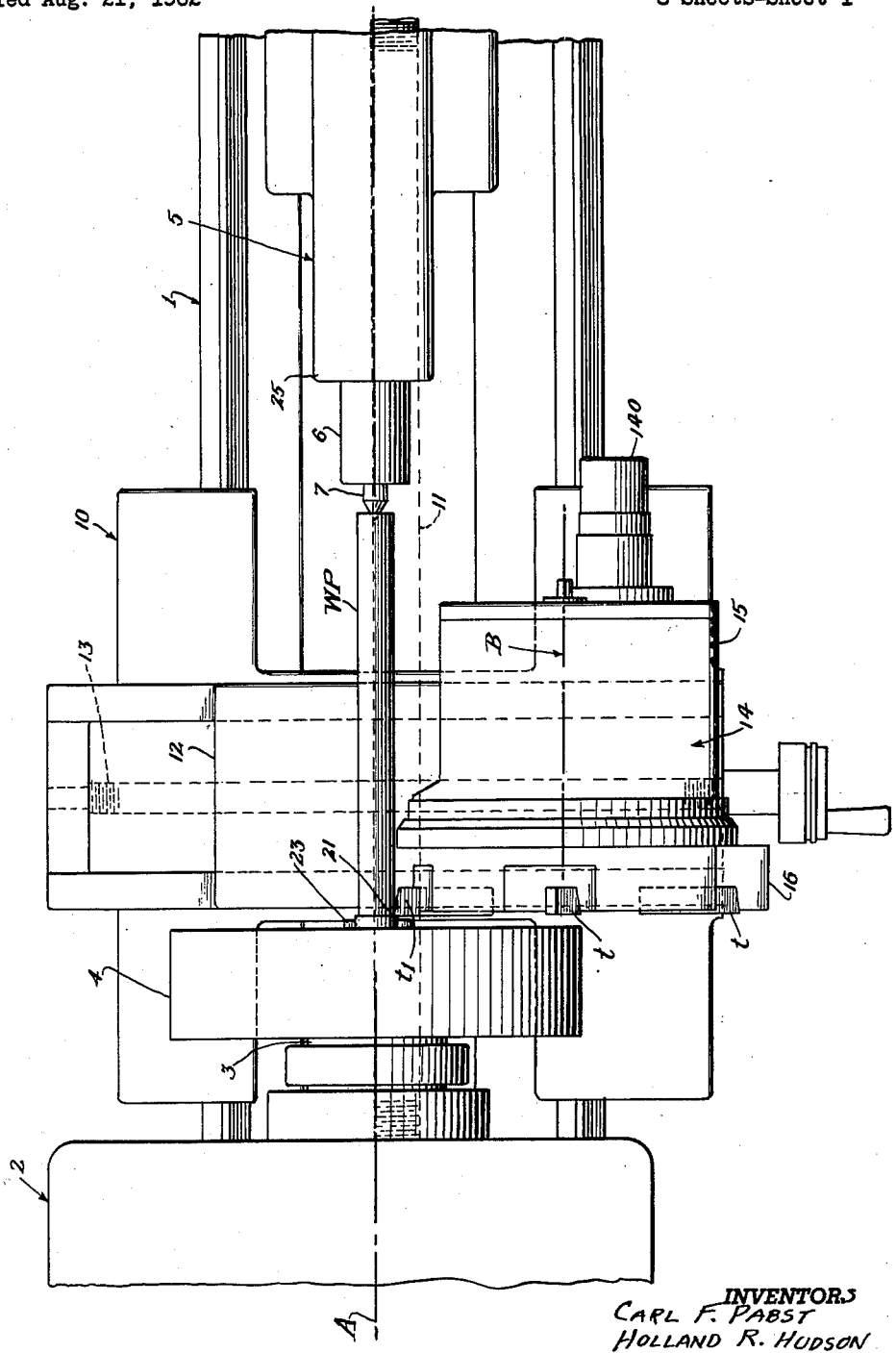
FIGURE 1 is a plan view of an embodiment of the invention in the form of an engine lathe with the tool carrying turret positioned toward the head stock.

In FIGURE 1 the lathe has a bed 1 and on the left hand end in a head stock 2 rotatably mounting a spindle 3 on the end of which is a chuck 4. The chuck supports one end of a workpiece WP. On the right hand end of the bed is a tail stock 5 having a plunger 6 supporting a live center 7 mounting the other end of the workpiece. The chuck and tail stock support the workpiece for rotation about a horizontal axis A. The head stock has the usual motor and driving gears (not shown) for rotating the spindle. The H-shaped carriage 10 is slidably mounted on the bed 1 for movement back and forth in a direction along the axis A. Power for moving the carriage is through a feed screw 11, the left hand of which is rotatably supported by the head stock and the right hand end is supported by the bed. On top of the carriage is a cross slide 12 mounted for reciprocating motion on the carriage at 90° to the axis A. The cross slide motion is provided by a feed screw 13. On top of the cross slide 12 is mounted a tool carrying turret structure 14.

The motion of the carriage 11 moves the turret structure in a direction along the axis of the work and motion of the cross slide moves the turret structure transverse to the axis of the work. As will be understood, the motors controlling the carriage feed screw 11, cross slide feed screw 13 and the spindle drive means all operate as dictated by the numerical control system for the lathe. The carriage and cross slide motions, of course, control the motion of any one of the tools carried on the turret for machining a workpiece.

Figure 4:
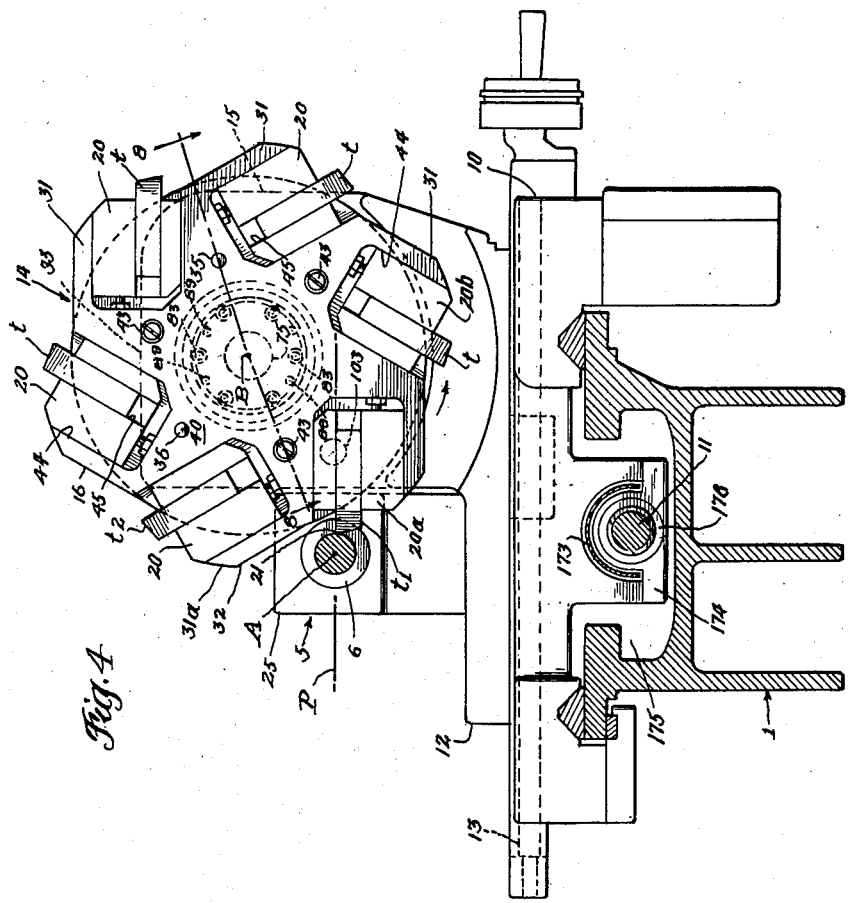
FIGURE 4 is a view taken along the line 4—4 in FIGURE 3 showing the general orientation of the tool holders on the turret.

The turret structure 14 has a support section 15 and a generally annular shaped or disc-like head section 16. The head section 16 is mounted on the support for rotation about an axis B which is parallel to the axis A. The head 16 is also mounted on the support for motion in a direction along the axis B. As best indicated in FIGURE 4, the turret head 16 carries a plurality of tool holders 20, each of which is identical in construction and adapted to mount tools $t$. Any one of the tools $t$ can be indexed into a work position, for example, as indicated for the tool $t_1$. In the work position, the cutting tip 21 of the tool $t_1$ lies in a plane P which contains the rotational axis of the work and the cutting tip. The turret head 16 is adapted to rotate and the tools are arranged on the head so that the tip of any tool rotates in a plane which is normal to the plane P and normal to the axis A.

One of the advantages of the present invention is that the structure of the vertically rotating turret head and its support provides that a tool, when in the working position, can be brought in for cutting minimum diameters both at the head stock and tail stock ends.

With reference to FIGURE 1, it will be noted that the left hand side 22 of the turret head is flat and vertically oriented. The tools $t$ project away from the surface a slight amount. As shown in the drawings, the projection is somewhat exaggerated for the sake of clarity. However, it will be understood that the projection of the tool, particularly the working tip, may be only in the order of a small fraction of an inch. It will be seen that the cutting tip 21 of the tool $t_1$ is very close to the jaws 23 of the chuck 4. The tip 21, while turning, can be brought up very close to the jaws, the practical limit simply being sufficient clearance between the face of the jaws and the tool.

Further it will be apparent that the tool tip 21 can be brought in until it lies on the axis A. This means, of course, that workpieces of very small diameter can be turned, the principal limitation being in the supporting of such a workpiece.

Also it will be observed that this close-in machining is accomplished without excessive tool overhang. As will be apparent from an inspection of FIGURE 4, the tool overhang is not greater than what might be found in conventional tool posts.

With the structure providing for machining close in to the axis A and close to the head stock, it will be apparent that machining can be accomplished without interference up to the maximum diameter for which the lathe is designed.

The structure of the turret also provides for machining close in to the live center of the tail stock and without excessive overhang of the tail stock plunger or of the tool. This will be apparent from an inspection of FIGURE 2 where it will be noted that the turret 14 has been moved up to the tail stock end and the tip 21 of the tool $t_1$ is aligned with the end face of the workpiece WP. The disc-like, compacted, vertically oriented head makes for minimum interference.

With reference to FIGURE 4, it will be seen that with the vertical rotating turret all of the tools except the tool in working position are substantially spaced from the tail stock plunger 6 and the tail stock head 25. The principal limitation in determining the radial position of the tool at the tail stock end is the physical size of the turret. However, this can be held to a minimum and with the vertical turret arrangement, the point of engagement between the turret and the tail stock plunger and head 25 is not at the maximum diameter of the head (taken in a horizontal plane), and therefore, the turret structure can be moved in farther.

Figure 2:
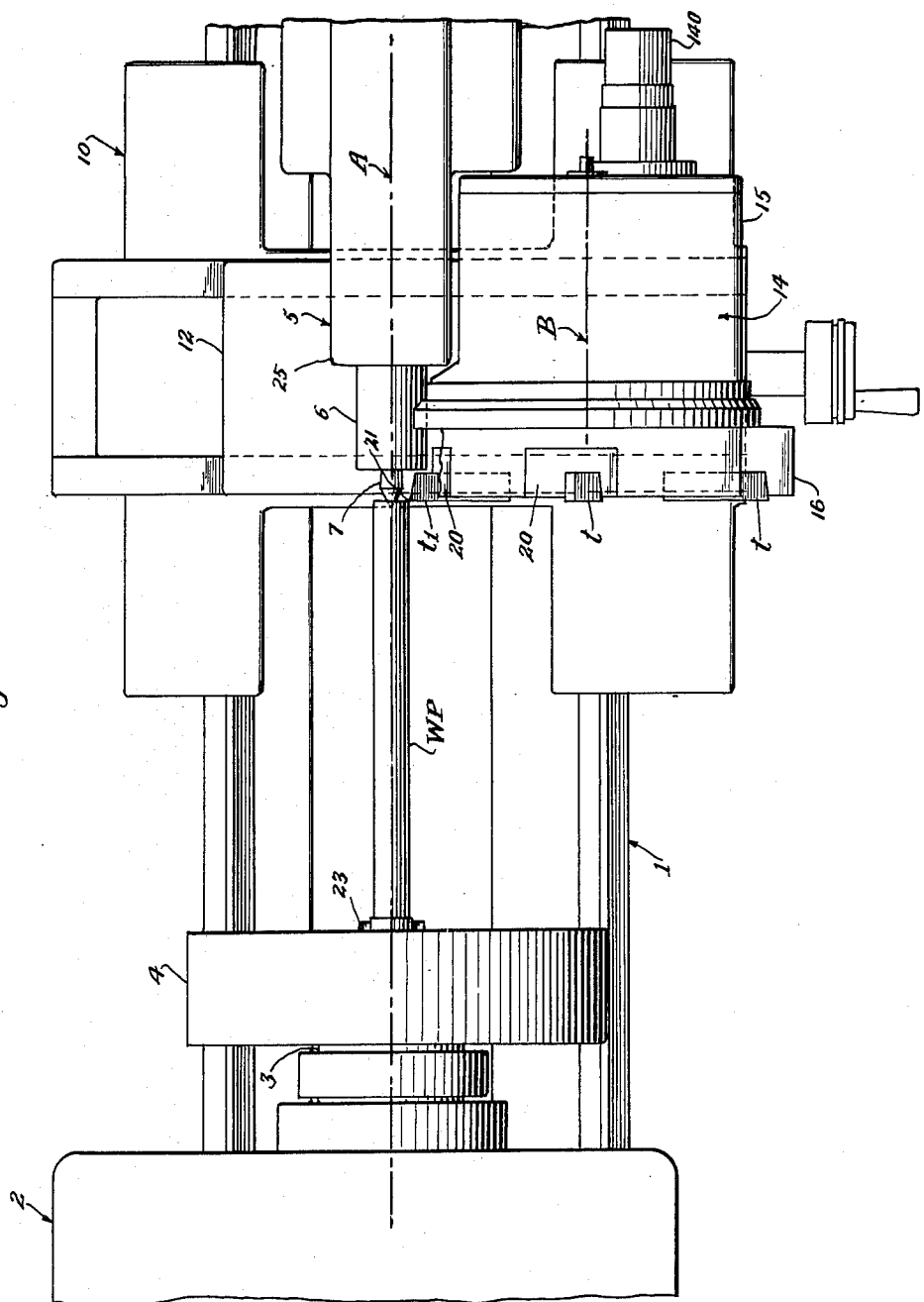
FIGURE 2 is a view of the embodiment of FIGURE 1 with the tool carrying turret positioned toward the tail stock.

With regard to plunger overhang, the invention provides that the overhang will not be over 4″ even when the turret is in the position shown in FIGURE 2. The 4″ overhang is well within the distance considered adequate to provide non-distortional support.

Figure 3:
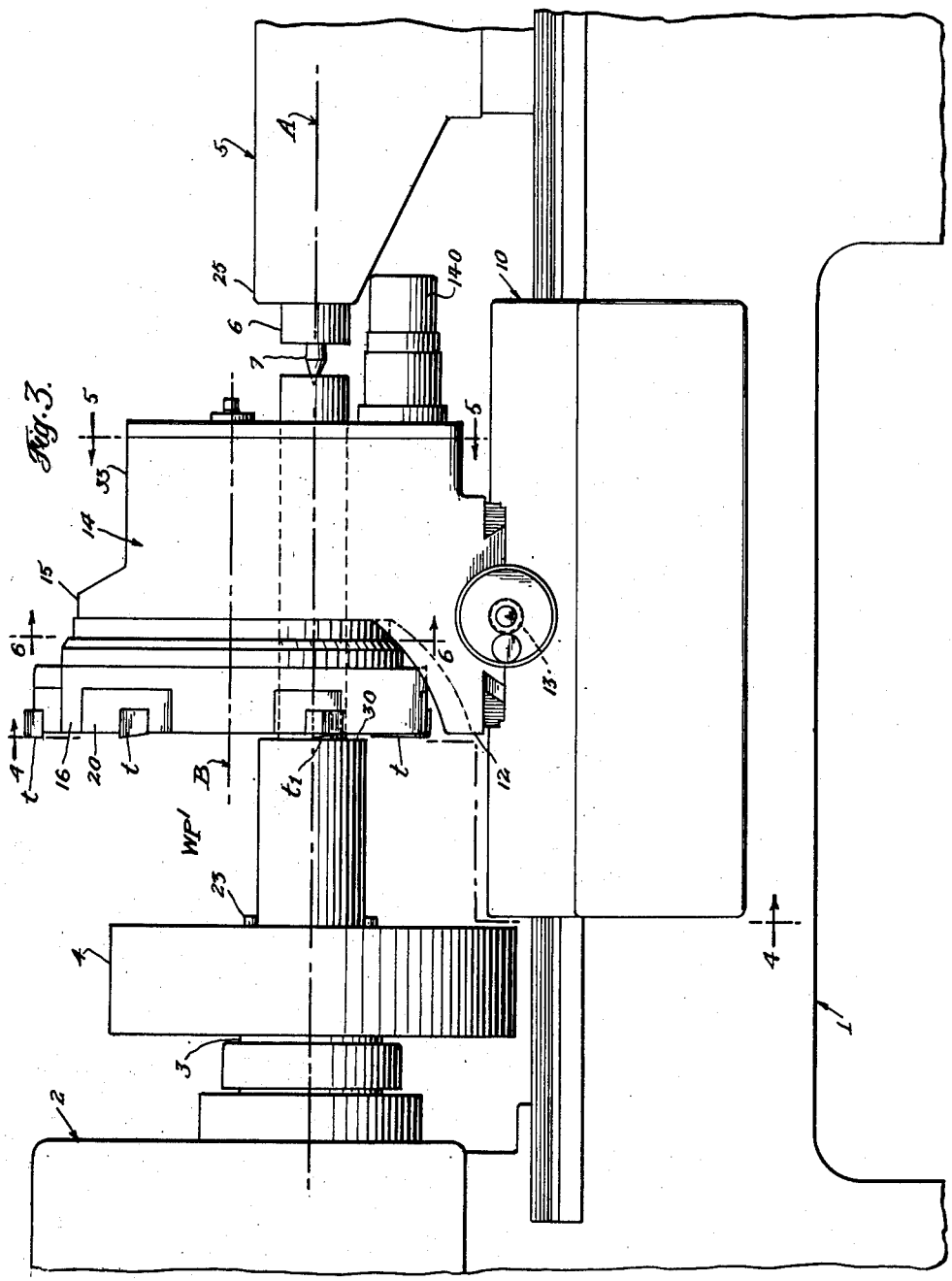
FIGURE 3 is a side elevational view of the embodiment of FIGURE 1 with the tool carrying turret toward the center of the machine.

In FIGURE 3 we have shown the workpiece WP′ to be of somewhat larger diameter than the workpiece WP. This is simply to illustrate the use of the turret in a facing operation. For example, as shown, the tool $t_1$ is machining the shoulder 30 on the workpiece WP′.

Aside from the advantage of small diameter machining work at the head stock and tail stock ends, the structure of the turret is such as to enhance the chip disposal problem. For example, with reference to FIGURE 4, it will be noted that the various tool holders 20 are supported within outboard sections 31 and when a tool is in the work position, for example, the tool $t_1$, the outboard section 31a just above the tool presents a beveled surface 32 so that chips moving upwardly will be deflected away from the turret. Furthermore, the rotation of the turret takes place counterclockwise as viewed in FIGURE 4 so that any chips accumulating on the parts of the tool holder 20a will tend to be thrown off when the tool holder is in the bottommost position, for example, in the position of the tool holder 20b. Additionally, the head 16 is round so that any chips which might fly to the top of the head will slide away. The top 33 of the support 15 is flat, however, this support is substantially spaced both axially and radially from the tool in its cutting position so that accumulations of chips on this surface are highly unlikely.

Another advantage of the invention is that the turret head is arranged to enhance the versatility of the machine from the standpoint of using a large number of tools, for example, as shown the turret head 16 is provided with a group of six tools. We have arranged a turret head so that in those instances where a program requires the use of more than six tools, all of the tools may be quickly removed and replaced by other tools. This is done by having all of the tools mounted in a tool carrier which occupies or is located with respect to known surfaces on the turret so that the carrier can be removed and replaced by a similar carrier without the necessity of compensating adjustments.

Figure 7:
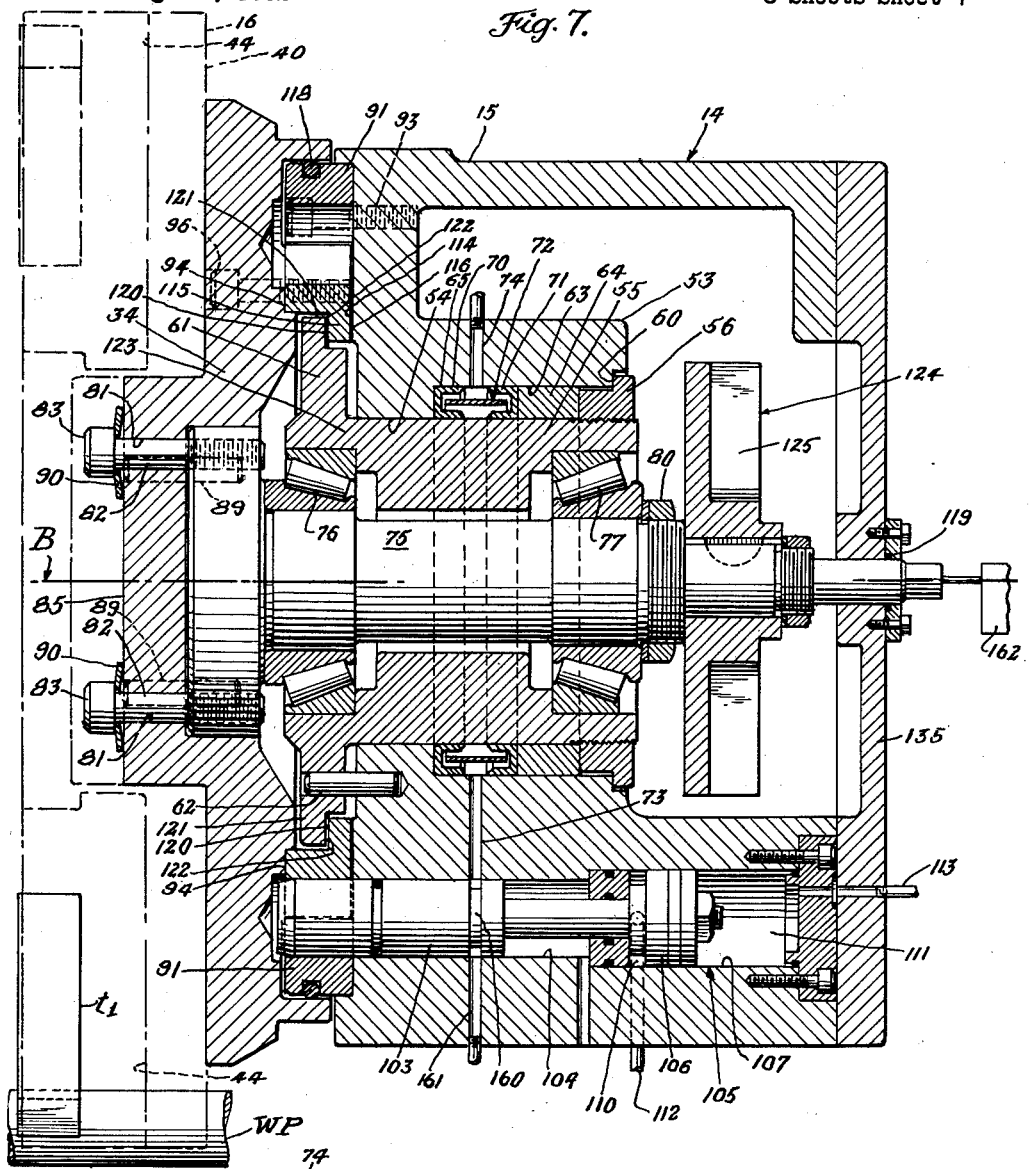
FIGURE 7 is a view taken along the line 7—7 in FIGURE 5; i.e., looking upwardly into the turret structure and illustrating in particular certain of the tool positioning mechanisms.
Figure 8:
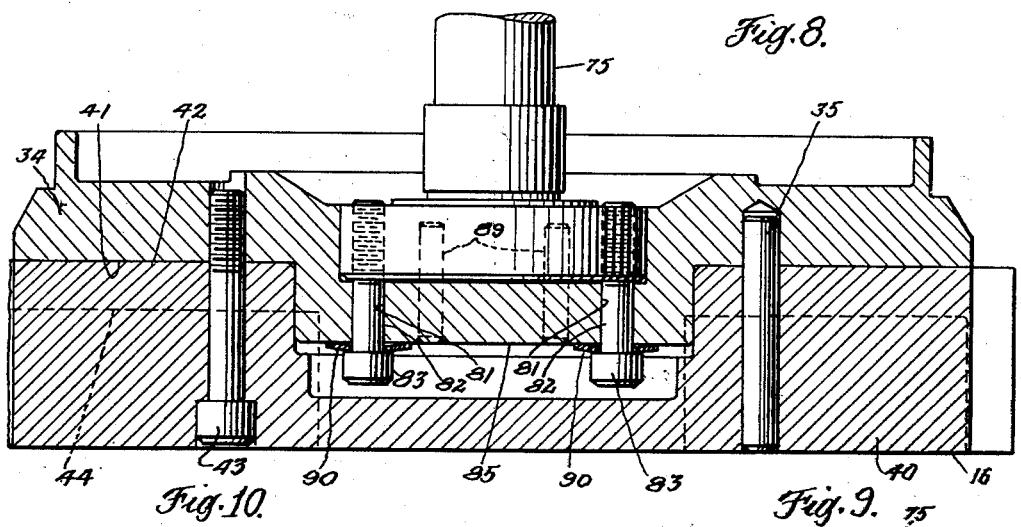
FIGURE 8 is a view taken along the line 8—8 of FIGURE 4 and illustrating the removable tool carrier and the manner in which the same is located on the turret.

With reference to FIGURES 7 and 8, it will be observed that the turret head includes a generally annular shaped face plate 34. The face plate carries a pair of dowel or locating pins, one of which is indicated at 35 in FIGURE 8 and the other at 36 in FIGURE 4, which locate the carrier body 40 with respect to the turret rotational axis B. The surface 41 on the plate and the surface 42 on the carrier body (FIGURE 8) locate the body axially. The bolts 43 secure the carrier to the plate. By making several carriers 40 of the same configuration, it will be seen that any one can be placed on the face plate and occupy the same radial and axial position with respect to the axis B.

Figures 9, 10:
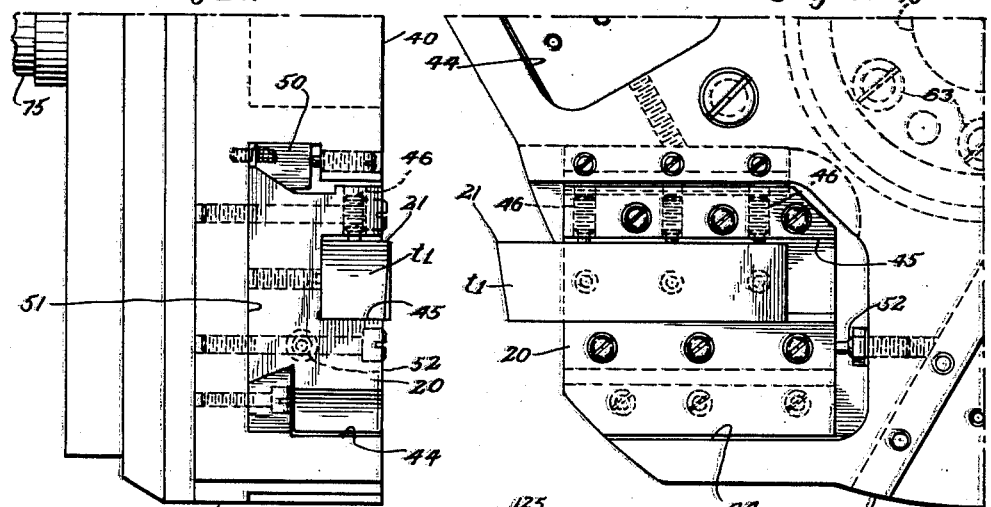
FIGURE 9 is a detailed view of a tool holder in position to cut a workpiece.
FIGURE 10 is an end view looking towards the right in FIGURE 9.

The carrier body 40 is provided with pockets 44 within which are disposed the various tool holders 20. The tool holders are of conventional form and only the tool holder mounting the tool $t_1$ will be described. As seen in FIGURES 9 and 10, the holder has a tool slot 45 carrying the tool $t_1$ which is held in the slot by the set screws 46. The tool can be loosened in the pocket by means of the adjustable gib 50. The surface 51 in the pocket and the adjustable screw 52 are used for locating the tool tip 21.

As will be understood, a first carrier can be set up on a jig on the bench and the various tools properly adjusted so that the carrier as a unit can be picked up and inserted on the turret face plate. After the six tools have worked the piece, the first carrier can be quickly removed and then replaced by a second carrier which has tools similarly adjusted.

Before going on, it might be noted here that the invention contemplates that when all of the tools are properly set up on a carrier, each of the tool tips rotate in a single plane which is perpendicular to the plane P and normal to the rotational axis A. For certain operations, it may be necessary that one or more or even all of the tool tips rotate in separate planes, however, each of these planes will be normal to the plane P and the axis A.

As pointed out heretofore, the vertical concept makes for considerable advantage from the standpoint of accurately indexing any tool to its work position and of locating the tool axially. Structure for accomplishing this will be described in connection with FIGURES 7 and 8.

As best seen in FIGURE 7, the support 14 includes a frame structure 53 which has a centrally located aperture 54. Within the aperture is a sleeve 55 and on the right hand end of the sleeve is a retaining ring 56 in radial and axial alignment with a shoulder 60 formed on the sleeve. On the other end of the sleeve is a flange 61. The sleeve is fitted into the aperture 54 so as to make a sliding fit which enables the sleeve to be moved along the axis B. A pin 62 extends between the sleeve flange 61 and the support frame 53. The pin permits axial motion of the sleeve but prevents rotation. The support has an axially extending recess 63 within which is a pressure ring 64 and a hydraulic jack 65 comprised of a pair of U-shaped cups 70 and 71 maintained in spaced position by the separator 72. Fluid is adapted to enter the jack via the line 73 and exit via the line 74.

Within the sleeve is mounted the turret drive shaft 75 which is rotatably supported in the sleeve by the thrust bearings 76 and 77. The bearings are adapted to be drawn up tight on the shaft by the nut 80. As indicated the shaft carries the face plate 34.

The connection between the shaft 75 and the face plate 34 provides for the face plate to rotate with the shaft and for relative motion between the shaft and face plate in a direction along the axis B. For this purpose the face plate is formed with a plurality of apertures 81 through which extend the shanks 82 of the bolts 83.

The shanks are threaded into the head of the shaft 75. The shanks 82 respectively make a clearance fit with the apertures 81. Between the heads 84 of the bolts 83 and the end face 85 of the face plate are the spring washers 90. As will be apparent, if the face plate 34 is held in a fixed position with respect to the axis B, the shaft 75 can be moved towards the right by virtue of the compression of the spring washers 90. The dowel pins 89 locate the face plate 34 with respect to the shaft 75.

Connected to the support frame 53 at a point radially outwardly of the sleeve flange 61 is an indexing ring 91. The indexing ring is accurately located on the support by the dowels 92 (FIGURE 6) and securely fastened to the support as by the screws 93.

Just inside of the support indexing ring 91 is another indexing ring 94 which is located on the face plate 34 as by the dowels 95 and secured in place by the screws 96. The ring 94 rotates with the face plate.

Figure 6:
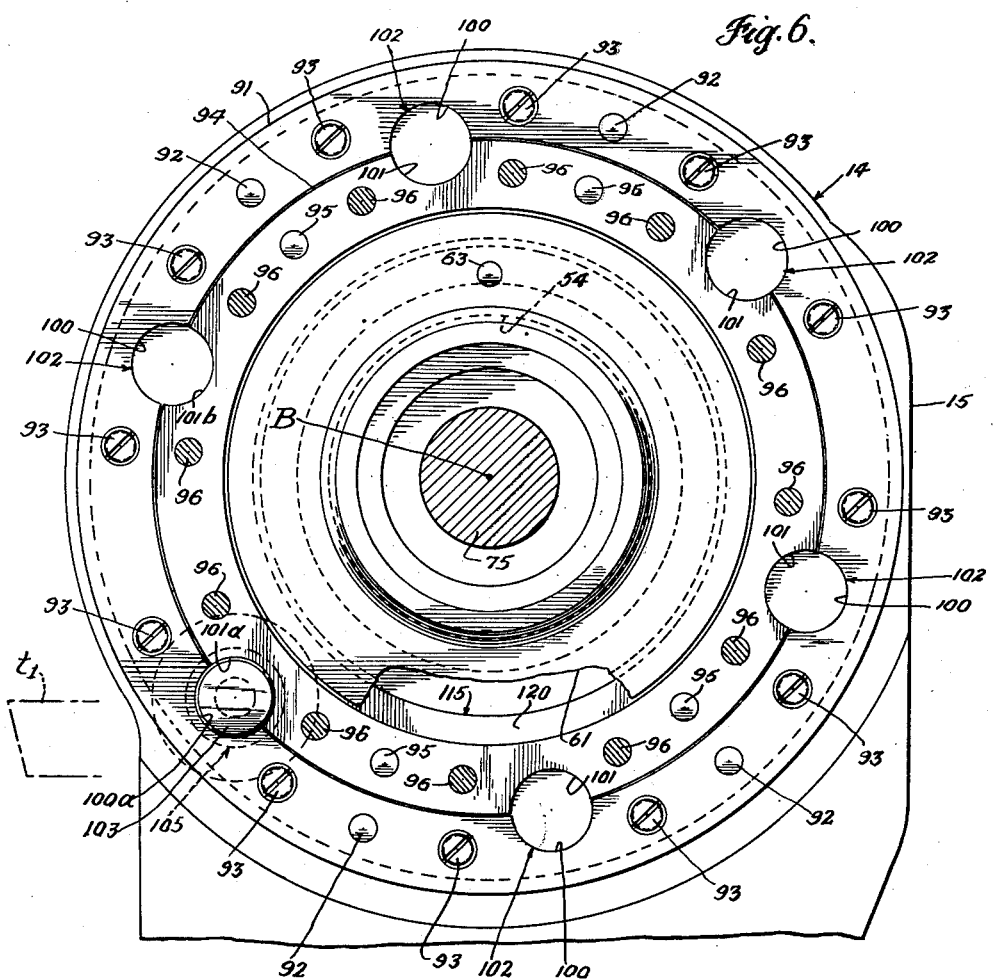
FIGURE 6 is an elevational view taken along the line 6—6 in FIGURE 3 and illustrating certain parts of the indexing mechanism.

Equally spaced about the inner surface of the support indexing ring 91 are a plurality of indexing slots 100 (FIGURE 6). Since there are six tools on the turret, there are six indexing slots. On the outer surface of the turret indexing ring 94 are similar indexing slots 101. As will be apparent from FIGURE 6, when the slots are aligned or occupy the same angular position with respect to the axis B, six apertures indicated by 102 are formed. The indexing slots are brought into alignment by virtue of the rotation of the face plate 34. There are six alignment positions corresponding to the six tool holders. For example, when the slot 101a on the turret head ring 94 is moved into alignment with the slot 100a on the support ring 91, the tool $t_1$ is brought to its working position as indicated in FIGURE 4. When the indexing slot 101b is brought into alignment with the support indexing slot 100a, the tool $t_2$ is brought into the working position. The other tools on the turret are similarly placed in working position by the alignment of the indexing slots.

For the indexing operation, the shaft 75 is rotated by means which will be described later, until the proper slot on the turret ring is brought into alignment with the slot 100a on the support ring. At that time, a lock bolt is adapted to move into the aperture formed by the rings and precisely align the movable ring (turret ring 94) with the fixed ring (support ring 91). The lock bolt for this operation is indicated at 103 in FIGURES 6 and 7 and is positioned in the aperture formed by the slots 100a and 101a. The indexing slots on the rings and the outside diameter of the lock bolt are dimensioned so that the lock bolt makes a sliding fit with the rings. By sliding fit is meant a total radial spacing in the order of 0.0001 inch. It will be observed that the lock bolt does not impose any forces on the rings, support or turret in order to perform its indexing or locating function.

The lock bolt 103 reciprocates in a cavity 104 formed in the support frame 53. The bolt makes a sliding fit with the cavity. The bolt is adapted to be reciprocated in the cavity by means of the jack 105 comprising the piston 106 and cylinder 107. The piston is reciprocated by controlling the fluid in the chambers 110 and 111 respectively fed by the lines 112 and 113.

In addition to its indexing function, the indexing rings and lock bolt serve the additional function of transferring cutting torque from the head to the support. In this connection, it will be noted in reference to FIGURE 6 that the bolt when disposed in the aperture is located substantially near the cutting tip of the tool. Also, with reference to FIGURE 7, it will be seen that the bolt when disposed in the indexing aperture is closely, axially spaced from the tool. With this relationship, moment arms as between the tool and the rings-bolt are relatively small and this is of advantage from the standpoint of minimizing distortion.

As mentioned heretofore, one of the significant advantages of the invention is that by virtue of the vertical arrangement, we are able to provide a relatively massive locating surface on to which the turret head can be clamped so that it always will occupy a known and fixed axial position for the working operation.

For the above purposes, the left hand end of the support is provided with an annular locating surface 114. In the lathe, the surface is oriented to be co-axial with and extend normal to the rotational axis B. The turret indexing ring 94 is formed with a foot 115 on one side of which is formed a bearing surface 116 which faces the locating surface 114. When the bearing surface and locating surface are engaged, the turret head is positioned at a desired point in a direction along the rotational axis A of the workpiece. The positioning of the turret head, of course, positions all of the tools mounted thereon. Providing that each of the tools is properly oriented on the turret head, each time a tool is indexed or brought into working position and the bearing surface and locating surface engaged, the cutting tip of the tool will have assumed the proper position for cutting a workpiece. Thus with correct indexing and axial locating, the path followed by the tool during a working operation will be the true path as dictated by the numerical control system.

As will be apparent, the surfaces 114 and 116 must be spaced from one another so that the turret head can rotate relative to the support for the indexing operation. It is preferred that the spacing be simply a sliding fit in the order of 0.0001 inch sufficient, for example, to provide for a film of oil between the locating and bearing surfaces. With regard to the latter point, it is preferred that interior space formed by the support and the head be filled with oil, the oil being retained on the left hand end by the O-ring 118 and on the right hand end by the O-ring 119. To obtain the sliding fit, the locating ring 56 is positioned so that it will engage the shoulder 60 on the support at a time when the screws 83 on the turret head have been tightened down to cause the spring washers 90 to be substantially flat. At this time, the bearing surface 116 and the locating surface 114 are in tight engagement so that the turret head is immovable. At this point, the screws 83 are backed off until such time as the turret head can be rotated, for example, by hand. Under these conditions, the axial distance between the locating surface 114 and the shoulder 60 on the support is just slightly less than the axial distance between the retaining ring 56 and the bearing surface 116 so that the sleeve, shaft and turret head have a very slight play or movement axially.

With regard to this axial movement, it will be recalled that the lock bolt 103 makes a sliding fit with the aperture formed by registered grooves. Therefore, the lock bolt will not impose any restraint on the head to interfere with the axial movement mentioned above.

For the proper positioning of the turret head, it is necessary that the sliding fit between the bearing and locating surfaces be eliminated so that the two surfaces are in engagement. This operation, of course, involves imposing forces on the turret head and the arrangement of the invention provides that these forces be applied in a manner which will minimize or eliminate distortions of the support or turret, which could effect the accuracy of the tool position.

On the extension 115 of the clamping ring 94 we have provided a clamping surface 120 over which extends the edge section 121 of the sleeve flange 61. The edge 121 has a clamping surface 122 radially aligned with the clamping surface 120.

When fluid is introduced into the hydraulic jack 65, the cups 70 and 71 will expand axially and cause the pressure ring 64, retaining ring 56, sleeve 55, shaft 75, face plate 34 and tool holder carrier to move to the right. Movement of all these parts in unison continues until such time that the bearing surface 116 on the face plate 34 engages the locating surface 114 in the support. The face plate 34 and tool carrier 40 are incapable of further axial movement. However, the connection between the face plate 34 and the shaft 75 is yieldable in a direction along the shaft axis, and therefore, the pressure in the jack 65 will cause the sleeve, and the shaft to continue moving axially, the axial movement being provided by the flexure of the springs 90. This motion will continue until the clamping surface 122 on the edge 121 engages the clamping surface 120 on the ring. The edge section 121 then exerts a substantial clamping force which breaks down the oil film between the locating surface 114 and the bearing surface 116 and brings the two surfaces into tight engagement. The axial spacing between the clamping surface 122 on the edge section or clamp 121 and the clamping surface 120 on the turret indexing ring is only in the order of 0.0005, so that the amount of axial movement of the clamp to engage and exert its clamping force is very small.

It is to be noted here that the above described arrangement eliminates distortion of the face plate 34 even though the clamping forces are transmitted to the plate via the screws 83 and springs 90. This comes about by virtue of the fact that distortion of the metal due to the clamping forces takes place in the joinder area 123 between the sleeve proper and its flange 61. The arrangement is such that the area 123 will bow in rather than the bearings 76 brinell the races or the central part of the face plate bow in.

It will be understood, of course, that distortion of the sleeve area 123 as mentioned above has no effect on the accurate locating of the turret face plate. Further, it will be understood that such distortion is relatively small.

From the above description, it will be apparent that the annular face plate 34 on the turret head is moved up against an annular locating surface and that it is fixedly held thereon by means which imposes clamping forces directly on and in axial alignment with the part of the plate (the foot 115) which is engaged with the locating surface. In view of the action of the area 123 and in view of the direct axially aligned clamping forces, there is very little, if any, force rising out of the clamping operation which is imposed on the face plate in a manner which would cause undesired distortion of the same.

In connection with the problem of distortion, it will be observed that the edge 121 and the foot 115 occupy the same radial positions and that the locating surface on the support is centrally, radially located. The locating, the bearing and the clamping surfaces are axially aligned and are symmetrical with respect to the support and the shaft. Reaction takes place with this symmetry so that there are no unbalanced loads with respect to the shaft. Further, it will be noted that the jack 65 has an axis which is co-axial with the shaft axis so that the forces developed by the jack are symmetrically applied.

Further, with reference to FIGURE 7 it will be observed that the inner portions of the various pockets 44 supporting the tool holder 20 are located in substantial axial alignment with the locating, bearing and clamping surfaces. This is of advantage in reducing the effects of moment arms due to axially directed forces arising out of the cutting operation.

Figure 5:
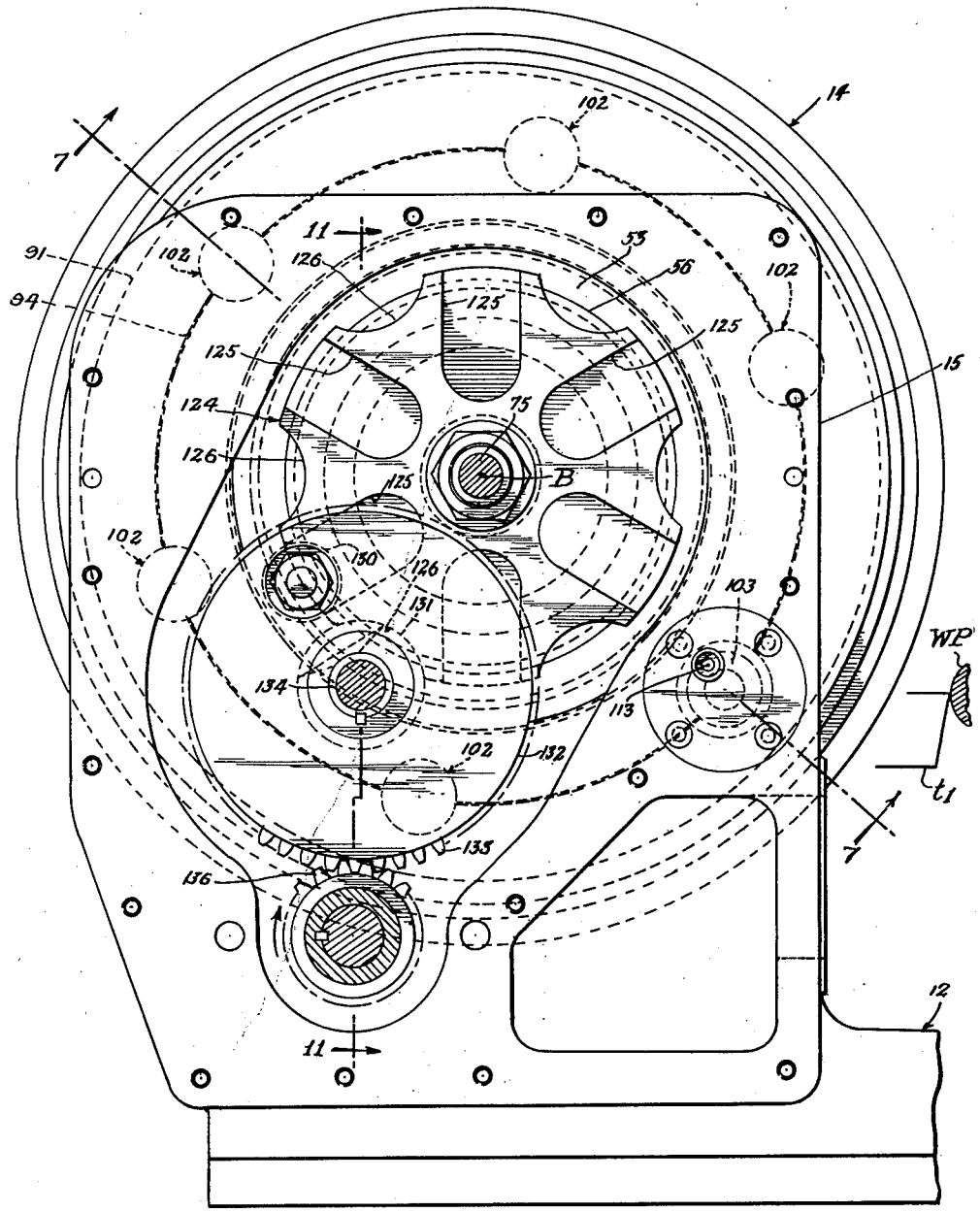
FIGURE 5 is an elevational view taken along the line 5—5 of FIGURE 3 and illustrating in particular certain parts of the drive means for rotating the turret head.
Figure 11:
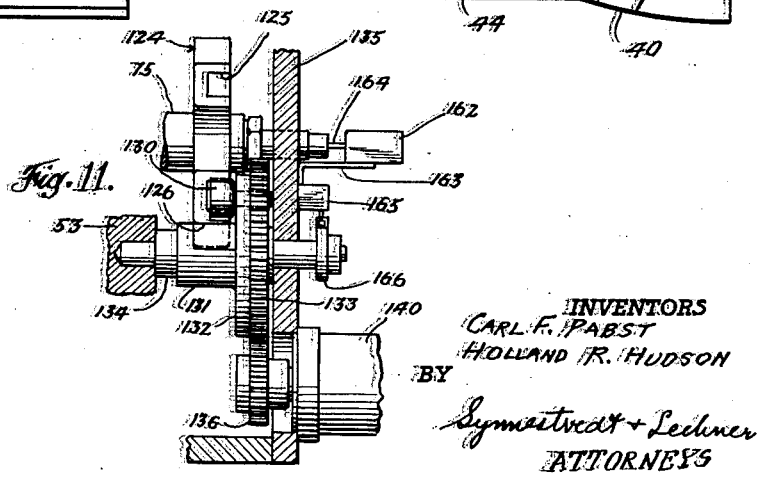
FIGURE 11 is a view taken along the line 11—11 in FIGURE 5 and illustrating certain components for rotating the turret.

The means for rotating the turret for the indexing operation takes the form of a conventional Geneva drive. With reference to FIGURE 5, a spider or wheel 124 is keyed to the shaft 75 and has driving slots 125 and locking slots 126. A pin 130 (see also FIGURE 11) is adapted to engage the drive slots and the lug 131 is adapted to engage with the locking slots 126. The pin and the lug are mounted on a rotor 132 integral with a gear 133. The gear and the rotor are mounted on a shaft 134 connected between the support 53 and the support cover plate 135. The gear 133 meshes with a pinion 136 connected to the fluid drive motor 140. As is well understood, the Geneva drive provides for an intermittent rotation of the turret.

Figure 12:
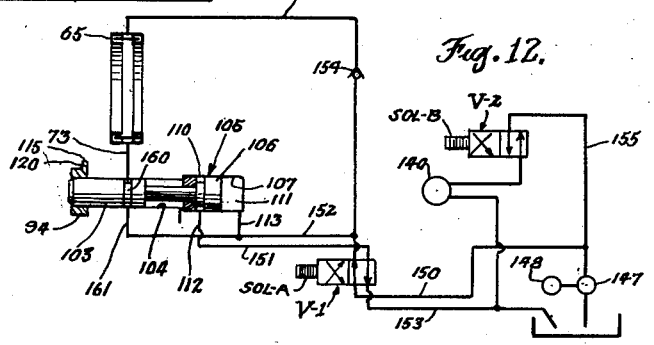
FIGURE 12 is a diagrammatical view of certain hydraulic mechanisms.

A typical hydraulic circuit for operating the above described mechanism is shown in FIGURE 12. This includes a pump 147 driven by a motor 148. The discharge side of the pump feeds valves V-1 and V-2 operated by the solenoids Sol.A and Sol.B. The solenoids are spring biased so that when the solenoids are de-energized, the valves make the connection as shown.

In the indexing operation, the lock bolt is first pulled out of the indexing aperture, the turret rotated to bring the proper tool holder into position and then the bolt again put in the indexing position.

First the solenoid Sol.A is energized which operates the valve V-1 to cause the motor 105 to pull back the bolt from the position shown. Fluid from the pump 147 goes through the line 150, through the valve V-1, the line 151 to the chamber 110. The chamber 111 is connected to drain through the line 113, line 152, valve V-1 to the line 153. The piston is moved out of the indexing position.

At this time the jack 65 is connected to drain via the line 74, check valve 154 and line 153. The turret is now free to be rotated.

To rotate the turret, the solenoid Sol.B is energized. Fluid from the pump 147 goes through the line 155, valve V-2 and to the motor 140. The turret head is rotated intermittently by the Geneva drive until it is stopped with the desired tool in working position. This is done by de-energizing the solenoid Sol.B to stop the motor 140 and by de-energizing the solenoid Sol.A to cause the jack 105 to put the lock bolt in index position and to energize the jack 65 to clamp the turret head against the locating surface 114.

When solenoid Sol.A is de-energized, the fluid in the chambers 110 and 111 is reversed and the bolt 103 moves into the indexing position. After the bolt is in position, the jack 65 is fed with fluid. The line 73 in the support is aligned with a passage 160 in the bolt. The passage 160 is also aligned with a passage 161 in the support. The passage 161 (FIGURE 12) is connected to pressure line 152 going to the discharge side of the pump via valve V-1 and line 150. The jack 65 can only be as described because the other line 74 to the jack 65 is blocked off from the pressure line 152 by the check valve 154. Thus, after the bolt 103 is driven home, the jack 65 operates to provide clamping pressure as described heretofore.

The circuit means for energizing and de-energizing the solenoids Sol.A and Sol.B are for the most part contained in the console housing of the numerical control system. Certain parts of the circuitry, however, are mounted on the turret structure and these include a bank of six switches mounted within a housing 162 supported by a bracket 163 on the cover plate 135. The switches are adapted to be actuated by cams mounted on a shaft 164 rotated by the shaft 75. One switch is actuated by a cam each time a corresponding tool holder arrives in the work position. Also, the turret includes a stop switch 165 mounted on the cover plate 135 and adapted to be actuated by a cam 166 connected to the Geneva shaft 134. The switch 165 is actuated each time the lug 131 is about midway in a locking slot 126.

Figure 13:
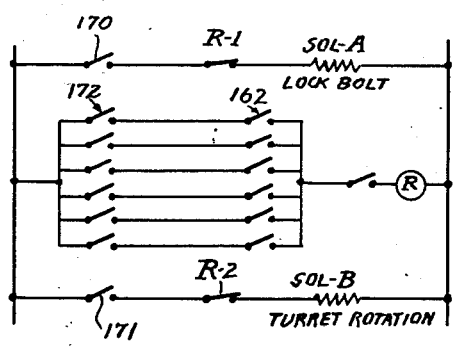
FIGURE 13 is a diagrammatic view illustrating certain electric control circuits.

A somewhat diagrammatic representation of a circuit for energizing and de-energizing the solenoids is shown in FIGURE 13. When the numerical control system closes the switch 170, the solenoid Sol.A is energized through the contacts R-1. As explained above, the energizing of solenoid Sol.A pulls back the lock bolt 103 out of its index position. Subsequently, a numerical control time delay switch 171 is closed, which energizes the solenoid Sol.B through the contact R-2. The energizing of solenoid Sol.B, as explained above, causes the motor 140 to begin rotating the turret head. The turret will continue to rotate until the R-2 contacts are open so that the solenoid Sol.B is de-energized. This is done by one of the six switches 172 having been closed by the numerical control system (depending upon which tool holder is selected for working), through the closing of one of the switches 162 which corresponds to the tool holder selected, and through the closure of stop switch 165. When the relay R is energized, the contacts R-1 and R-2 open, which causes the turret to stop and the lock bolt to go back into place. For the next cycle of operation the closed switch 172 is opened which de-energizes the relay R so that the contacts R-1 and R-2 close and with the closure of switch 170, the cycle is repeated. As will be understood, the circuit shown in FIGURE 13 is diagrammatic and certain of the interlocks and holding and bypassing circuits are omitted.

Before closing, it is pointed out with reference to FIGURE 4 that the carriage feed screw 11 is covered by a chip guard 173 which is supported (as viewed in FIGURE 1) on the left hand end by the head stock and on the right hand end by the bed. The carriage has a means 174 which projects down through the space 175 between the chip guard and carriage bed to support the drive nut 176. This structure is of the kind disclosed in copending application of Carl F. Pabst and Paul Newmann, Serial No. 202,438 filed June 14, 1962.

We claim:

1. A turret structure for use in a machine tool comprising:
    a support formed with an aperture;
    a shaft in the aperture;
    means rotatably mounting the shaft in the aperture for rotation and for movement in a direction along the rotational axis;
    means on the support forming a fixed, annular locating surface surrounding the rotational axis of the shaft;
    a turret head;
    means connecting the turret head with the shaft for rotation therewith and including resilient means providing for axial movement of the shaft and head in unison and permitting relative axial movement between the shaft and the head, the axial movement being in a direction along the rotational axis of the shaft;
    means on the turret head forming a bearing surface facing said locating surface;
    means connected between the support and the head to axially space the locating and bearing surfaces to provide for a sliding fit, the sliding fit permitting the rotation of the head;
    means on the head forming a clamping surface spaced from the bearing surface in a direction along said rotational axis;
    clamp means connected with the shaft and extending over the clamping surface in position to engage the clamping surface when the shaft is moved in a direction along its rotational axis;
    means connected between the support and the shaft and exerting forces to move the shaft axially, the yielding connection causing the head to move axially with the shaft until the bearing surface engages the locating surface and the yielding connection permitting further axial movement of the shaft so that the clamp means contacts the clamping surface and exerts forces to tightly engage the locating and bearing surfaces.

2. A turret structure for use in a machine tool comprising:
    a support formed with an aperture;
    a sleeve supported in the aperture;
    means preventing rotation of the sleeve in the aperture but providing for axial movement thereof;
    a shaft in the sleeve;
    means mounting the shaft in the sleeve for rotation and for axial movement with the sleeve;
    means on the support forming a fixed, annular locating surface surrounding the rotational axis of the shaft;
    a turret head;

means connecting the turret head with the shaft for rotation therewith and including resilient means providing for axial movement of the shaft and the head in unison and permitting relative axial movement between the shaft and the head, the axial movement being in a direction along the rotational axis of the shaft;

means on the turret head forming a bearing surface facing said locating surface;

means connected between the support and the head to axially space the locating and bearing surfaces to provide for a sliding fit, the sliding fit permitting the rotation of the head;

means on the head forming a clamping surface spaced from the bearing surface in a direction along said rotational axis;

a flange on the sleeve extending radially outwardly over the clamping surface in position to engage the clamping surface when the shaft is moved in a direction along its rotational axis; and means connected between the support and the sleeve and exerting forces to move the sleeve and shaft axially, the yielding connection causing the head to move axially with the shaft until the bearing surface engages the locating surface and the yielding connection permitting further axial movement of the shaft so that the flange engages the clamping surface and exerts forces to tightly engage the locating and bearing surfaces.

3. A turret structure for use in a machine tool comprising:

a support formed with an aperture;

a sleeve disposed in and engaged with said aperture, the engagement providing for movement of the sleeve in a direction along the axis of the aperture;

means connected between the sleeve and the support preventing rotation of the sleeve but permitting axial movement;

a locating ring threaded on the sleeve adjacent one end thereof;

an annular shoulder formed on the support to engage the locating ring with axial sleeve movement;

a shaft in said sleeve;

means rotatably mounting the shaft in the sleeve with the rotational axis of the shaft and the axis of the aperture being co-axial;

a face plate disposed on one end of said shaft;

mechanism connecting the face plate with the shaft for rotation therewith and including a resilient means providing for axial movement of the shaft and plate in unison and permitting relative axial movement between the shaft and the face plate, the axial movement being in a direction along the rotational axis of the shaft;

an index ring mounted on the support and having an annular locating surface surrounding the rotational axis of the shaft;

an index ring on the face plate and disposed radially inwardly of the support index ring and being formed with a bearing surface facing the locating surface, the retaining ring on the sleeve engaging the shoulder on the support and bearing surface and the face plate index ring being spaced from the shoulder so as to be axially spaced from the locating surface on the support index ring to provide for a sliding fit between the locating and bearing surfaces, the sliding fit permitting rotation of the face plate;

means forming a clamping surface on the face plate ring axially spaced from the bearing surface;

a flange formed on the sleeve and extending radially outwardly and over the clamping surface to contact the same when the sleeve is moved axially;

a hydraulic jack surrounding the sleeve and operating as between the support and the sleeve to exert an axially directed force to move the sleeve and the shaft axially, the yielding connection causing the face plate and the index ring to move axially with the shaft until the bearing surface engages the locating surface and the yielding connection permitting further movement of the shaft and sleeve so that the flange on the sleeve contacts the clamping surface and exerts an axial force to tightly engage the bearing and locating surfaces;

a plurality of index slots respectively formed on the face plate index ring and an index slot formed on the support index ring, the slots in the face plate index ring being brought into registry with the slots on the support index ring in a plurality of rotational positions on the turret, a pair of grooves forming an aperture when in registry;

a lock bolt mounted for movement toward and away from the index rings; and means to move the lock bolt into the aperture formed when a groove on the face plate index ring is in registry with a groove on the support index ring, the grooves and the bolt being dimensioned to make a sliding fit to permit axial movement of the face plate.

4. A construction in accordance with claim 3 further including an interlock to provide for operation of the hydraulic jack only when the index bolt is disposed between the index rings.

5. In a machine tool:

a bed;

means on the bed mounting a workpiece for rotation about an axis;

a support;

means mounting the support on the bed for movement in a direction parallel to said rotational axis and for movement transverse said rotational axis;

a turret head;

mechanism mounting the turret head on the support for rotation about an axis parallel to the rotational axis of the workpiece and for movement in a direction along its rotational axis;

a yieldable connection between said turret head and said mechanism and providing for axial motion of the mechanism relative to the turret head;

means mounting a plurality of cutting tools on the turret head, the tools being spaced from one another around the rotational axis of the head and the cutting tips of the tools lying in a plane normal to the rotational axis of the workpiece;

means on the support forming a fixed, annular locating surface surrounding the rotational axis of the turret head, the locating surface lying in a plane normal to the rotational axis of the workpiece;

means on the turret head forming a bearing surface parallel to and facing the locating surface, said axial movement of the turret head providing for the locating and bearing surfaces to be spaced from one another to permit rotation of the turret head and for the locating and bearing surfaces to engage one another;

means on the turret head forming a clamping surface spaced from the bearing surface in a direction along the rotational axis of the turret head;

drive means connected between said support and said mechanism for axially moving the mechanism and the turret head to cause said bearing surface to engage said locating surface;

clamp means on said mechanism and operative when said bearing and locating surfaces are engaged to be moved axially by axial movement of said mechanism to engage the clamping surface and exert axially directed forces on the clamping surface to tightly engage the bearing and locating surfaces and thereby locating the tips of the tools in predetermined, fixed position along the rotational axis of the workpiece and maintaining the tips in the fixed position during a working operation, the axial movement of said mechanism to operate said clamp being permitted by said yielding connection and the axial movement of said mechanism being effected by said drive mechanism.

6. A turret structure for use in a machine tool comprising:
a support;
a turret head;
mounting means mounting the turret head on the support for rotation and for movement in a direction along the rotational axis;
means on the support forming a fixed annular locating surface surrounding the rotational axis of the turret head;
means on the turret head forming a bearing surface facing the locating surface, said axial movement of the turret head providing for the locating and bearing surfaces to be spaced from one another to permit the rotation of the turret head and for the locating and bearing surfaces to engage one another;
drive means connected with said support and said turret head for moving the turret head axially to cause said bearing surface to engage said locating surface;
means on the turret head forming a clamping surface spaced from the bearing surface in a direction along said rotational axis; and
clamp means on said mounting means movable axially independently of said turret head and operative when said drive means has moved the turret head axially and engaged the bearing and locating surfaces to move axially and engage the clamping surface and exert axially directed forces on the clamping surface to cause the bearing and locating surfaces to be tightly engaged and thereby locating and holding the turret head in a fixed position along its rotation axis.

7. A turret structure for use in a machine tool comprising:
a support;
a turret head;
mounting means mounting the turret head on the support for rotation and for movement in a direction along the rotational axis;
a plurality of mechanisms formed on the turret head for respectively mounting a plurality of tool holders, the mechanisms being arranged in annular form around the rotational axis of the turret head and disposed the same radial distance from the rotational axis;
means on the support forming a fixed annular locating surface surrounding the rotational axis of the turret head;
means on the turret head forming an annular bearing surface facing said locating surface and disposed substantially the same radial distance from the turret head as said mechanisms, said axial movement of the turret head providing for the locating and bearing surfaces to be spaced from one another to permit the rotation of the turret head and for the locating and bearing surfaces to engage one another;
drive means connected with said support and said turret head for moving the turret head axially to cause said bearing surface to engage said locating surface;
means on the turret head forming an annular clamping surface spaced from the bearing surface in a direction along said rotational axis and being substantially the same radial distance from the rotational axis as said bearing surface; and
clamp means on said mounting means movable axially independently of said turret head and operative when said drive means has moved the turret axially and engaged the bearing and locating surfaces to move axially and engage the clamping surface and exert axially directed forces on the clamping surface to cause the bearing and locating surfaces to be tightly engaged and thereby locating and holding the turret head in a fixed position along its rotational axis.

8. A turret structure for use in a machine tool comprising:
a support;
a turret head;
means mounting the turret head on the support including a sleeve mounted in the support for axial movement and rotary bearing means on the sleeve supporting the turret head, the bearing means providing for rotation of the turret head with the sleeve providing for movement of the turret head in a direction along the rotational axis;
means on the support forming a fixed annular locating surface surrounding the rotational axis of the turret head;
means on the turret head forming an annular bearing surface facing the locating surface, said axial movement of the turret head providing for the locating and bearing surfaces to be spaced from one another to permit the rotation of the turret head and for the locating and bearing surfaces to engage one another;
drive means connected with said support and said sleeve for moving the sleeve and turret head axially to cause said bearing surface to engage said locating surface;
means on the turret head forming an annular clamping surface spaced from the bearing surface in a direction along said rotational axis; and
clamp means on said sleeve movable axially independently of said turret head and operative when said drive means has moved the turret head axially and engaged the bearing and locating surfaces to move axially and engage the clamping surface and exert axially directed forces on the clamping surface to cause the bearing and locating surfaces to tightly engage and thereby locating and holding the turret head in a fixed position along its rotational axis.

9. A turret structure for use in a machine tool comprising:
a support;
a turret head;
means mounting the turret head on the support including a sleeve mounted in the support for axial movement and rotary bearing means on the sleeve supporting the turret head, the bearing means providing for rotation of the turret head and the sleeve providing for movement of the turret head in a direction along the rotational axis;
a yieldable connection between said turret head and said sleeve and permitting axial motion of the sleeve and bearing means relative to the head;
means on the support forming a fixed annular locating surface surrounding the rotational axis of the turret head;
means on the turret head forming an annular bearing surface facing the locating surface, said axial movement of the turret head providing for the locating and bearing surfaces to be spaced from one another to permit the rotation of the turret head and for the locating and bearing surfaces to engage one another;
drive means connected with said support and said sleeve for moving said sleeve and turret head axially to cause said bearing surface to engage said locating surface;
means on the turret head forming an annular clamping surface spaced from the bearing surface in a direction along said rotational axis; and
clamp means on said sleeve and axially movable with the sleeve after the engagement of said bearing and locating surfaces to engage the clamping surface and exert axially directed forces on the clamping surface to cause the bearing and locating surface to be tightly engaged and thereby locating and holding the turret head in a fixed position along its rotational axis, the axial movement of said sleeve and turret head to engage the locating and bearing surfaces being effected by said drive means and the axial movement of said sleeve and said clamp means being effected by said drive means and permitted by said yieldable connection.

10. A construction in accordance with claim 9 wherein said clamping surface and said bearing surface are substantially the same radial distance from the rotational axis of the turret head.

References Cited by the Examiner
UNITED STATES PATENTS

| | | |
|---|---|---|
| 556,415 | 3/96 | Hartness. |
| 1,703,986 | 3/29 | Brown. |
| 2,368,736 | 2/45 | Wyrick. |
| 2,862,408 | 12/58 | Stirrett. |
| 2,929,274 | 3/60 | Goss _____ 74—824 |

FOREIGN PATENTS

| | | |
|---|---|---|
| 127,289 | 10/45 | Australia. |
| 284,516 | 11/52 | Switzerland. |

WILLIAM W. DYER, Jr., *Primary Examiner.*